April 3, 1962     E. R. McCARTER ETAL     3,028,579
ANALOG CARD PROGRAMMING DEVICE Filed June 25, 1957     3 Sheets-Sheet 1

Ed. R. McCarter
Robert L. Wilcox,    Inventors

By W. O. Teelman   Attorney

April 3, 1962    E. R. McCARTER ETAL    3,028,579
ANALOG CARD PROGRAMMING DEVICE
Filed June 25, 1957      3 Sheets-Sheet 2

Ed R. McCarter
Robert L. Wilcox    Inventors
By W. O. Teilman Attorney

April 3, 1962 E. R. McCARTER ETAL 3,028,579
ANALOG CARD PROGRAMMING DEVICE
Filed June 25, 1957 3 Sheets-Sheet 3

Ed R. McCarter  Inventors
Robert L. Wilcox
By W. U. Heilman  Attorney

United States Patent Office 3,028,579
Patented Apr. 3, 1962

3,028,579
ANALOG CARD PROGRAMMING DEVICE
Ed R. McCarter and Robert L. Wilcox, Tulsa, Okla., assignors, by mesne assignments, to Jersey Production Research Company
Filed June 25, 1957, Ser. No. 667,913
8 Claims. (Cl. 340—15)

This invention is broadly concerned with a system for correcting seismic records. More particularly, the invention is concerned with a system for preparing a corrected seismogram from uncorrected field records in which the corrections to the individual traces are entered automatically in response to a preselected program. The invention is particularly adapted for use in conjunction with apparatus in turn adapted to prepare a seismic section, preferably visual in character, from one or more reproducible-type seismograms. The invention enables such apparatus to operate in a substantially automatic manner, reproducing each trace from the seismogram in a predetermined sequence, automatically incorporating predetermined seismic corrections, and thereafter automatically recording the corrected trace information on a record medium in the form of a seismic section.

Geophysical prospecting procedures using artificially induced seismic disturbances have found wide application in the search for petroleum and other mineral deposits. In all of these methods it is general practice to initiate an explosion or other seismic disturbance at a point near the surface of the earth and to direct seismic waves downward into the earth from that point. The waves continue to travel downward within the earth, until they encounter discontinuities in the earth's structure in the form of various substrata, formations, and the like. The discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. Furthermore, by using accurate timing devices and recording means, it is possible to determine not only the magnitude of the signals received by the various geophones but also to measure the times required for the seismic waves to travel from the disturbance point down to the various discontinuities and thence to the geophones. By knowing this information and by measuring the distances between the various geophones and the seismic disturbance point and by further measuring or assuming velocities of seismic waves in the particular section of the earth under study, it is possible to calculate and determine the depths of the various discontinuities beneath the surface of the earth.

In ascertaining the depths of subterranean strata or other seismic reflection events, it is necessary to make two general classes of corrections in the original seismic data. First, it is necessary to make certain "static" corrections which are static or fixed quantities for each signal detected and recorded by a given geophone or transducer location. Corrections in this category include the height of a geophone relative to an assumed datum, the velocity of the seismic waves through a low velocity layer immediately adjacent the earth, the elevation of the disturbance or shot point relative to the datum, etc.

A second type of corrections that must be made to the seismic records are of the so-called "dynamic" or "variable" type in that the magnitude of the correction varies with time for the signals that are received by any given geophone or transducer location. This category of corrections includes the "spread" or "step-out" correction which is a function of the distance of a geophone location from a shot point; and it also includes any correction that is occasioned by variations in seismic velocity with depth in the section of the earth under study.

The earliest types of seismic recorders—i.e. means for recording the electrical signals generated by the seismic transducers—for the most part employed oscillographic-type pens or reflecting mirrors for generating oscillographic, ink or photographic traces on suitable recording media. Many recorders such as these are still used today, and a single unit may record the signals from as many as thirty or more geophone locations. In general, the trains of signals from each geophone location are recorded in a side-by-side relation on a moving recorder paper or photosensitive film.

While the oscillographic trace recorders have proved to be very valuable in analyzing seismic data, they nevertheless have had serious disadvantages. For example, it has always been necessary to "pick" information or data from the records and to apply mathematical calculations to the data thus picked in order to obtain information concerning the reflections indicated on the records. Additionally the records themselves are rather difficult to study and interpret. In short, the records present a difficult problem for seismic interpreters, and they are both expensive and time consuming to study.

More recently, seismic recorders of a reproducible type have been developed; and these recorders are finding ever increasing application at the present time. These recorders derive their name from the fact that they receive electrical signals from geophone locations and transform these signals into variable intensity traces which are reproducibjle in character. Thus, the recorders may be of a photographic type in that they form traces of variable density or variable area characteristics. Alternatively, they may develop variable intensity magnetic traces on a magnetizable medium such as wire, tape or the like. In general, all reproducible recorders and traces are characterized by the fact that the trace information may be scanned by a suitable transducer to generate trains of electrical signals in response to the trace information on the reproducible recording medium. These recorders have been found to have very good fidelity in that the "seismic signals" reproduced from the records are generally very comparable with the electrical signals that are generated by the geophones at the geophone locations. And, as in the case of the oscillographic recorders, the individual traces on any record are generally in a side-by-side relation. The records are generally referred to as seismograms. It will be recognized that the reproduced signal must be demodulated to recover the "pure" seismic signal in the event that a carrier signal was modulated by the latter signal in the process of recording; and filters may be used as desired to emphasize certain signal frequencies.

Reproducible-type seismic recorders—and especially magnetic tape recorders—have been found to be especially valuable to the seismic interpreter. Not only may the records be played over and over without damage to the records—thus permitting considerable experimentation with the recordings; but they may also be processed by recently developed equipment to form directly observable seismic sections. In this connection variable density photographic sections have proven to be especially valuable and desirable in that they afford striking presentations of portions of the earth. The positions and types of subterranean strata reveal themselves very clearly in sections of this type.

The equipment that is used to prepare seismic sections from reproducible seismic records is popularly referred to as "playback" or "office playback" equipment in that it plays back the information on the original records to generate the rseulting seismic section. Manually operated adjustments on the equipment enable the operator thereof to incorporate both static and dynamic corrections to each signal trace on the original records, so that the sections may be partially or completely corrected when completed.

It can be readily recognized that reproducible-type seismic recorders and playback units are invaluable in facilitating the problems of seismic recording and interpretation. It can further be recognized, however, that such equipment is both complex and expensive. Furthermore, while presently available playback equipment provides faster interpretation of seismic information than was previously possible; it should be noted that the present equipment is essentially manual in its operation, and it requires substantially the entire time of an operator.

In view of the important and yet expensive nature of seismic interpretation work, it is accordingly an object of this invention to provide improved apparatus for preparing seismic sections from reproducible type field seismic records or seismograms. It is also an object of the invention to increase the speed of operation of presently available office playback equipment and to reduce markedly the personnel time required to operate the equipment. It is a more particular object of the invention to render substantially automatic the operation of playback equipment and to reduce the time required for operating the equipment.

These and related objects, which will be expressly described or readily apparent from the description that follows, may be realized in accordance with this invention by the use of preprogramming and sequence control means adapted to automatically incorporate or otherwise apply predetermined seismic corrections to information as it is transposed from a seismogram into a seismic section. In other words, the corrective and other components of a playback system are provided with positioning and position selector means adapted to incorporate the desired and necessary corrections to each reproduced seismic trace and in a sequence to agree with the sequence in which the traces are reproduced. The positioning means causes the corrections to any given trace to be incorporated within the trace; the programming or selector means enables the operator to preprogram the corrections in the order in which the traces are to be reproduced; and the sequence control means designates the order in which the traces are played.

The invention may be better understood by reference to the attached drawing in which:

FIGURE 1 illustrates in a perspective view the essential components of commercially available playback equipment adapted to produce a visual-type multi-trace seismic section from a multi-trace reproducible record of the magnetic tape type. The apparatus in this figure is illustrated as it would be modified by a preferred embodiment of the present invention. It further illustrates the best mode contemplated for carrying out the objects of the invention.

Figure 1:
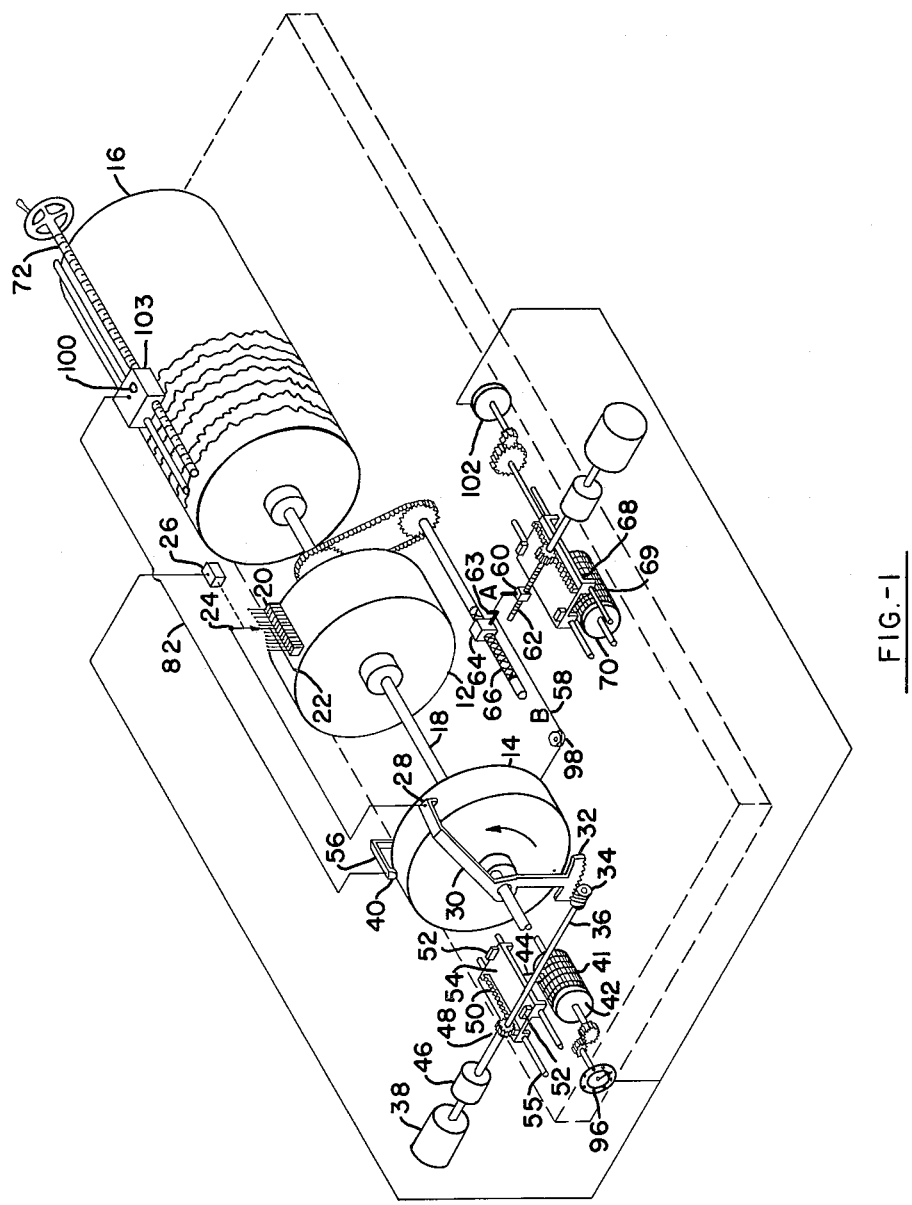

Before entering into a detailed consideration of the above figures, it is well to note that several terms in the following description are assumed to have the following meanings for the purposes of the description. Thus, the term reproducible seismogram is intended to mean a multi-trace reproducible recording of a plurality of geophone signals from a seismic observation. The term reproducible is intended to mean that the trace information may be translated into trains of electrical signals by scanning the traces with a suitable reproducing device or means. For example, in the case of a magnetic-type seismogram, a suitable reproducing or recording device would be a magnetic head.

The term recording medium or record medium in this description is intended to mean either a non-reproducible or a reproducible type record medium such as paper or photographic film, respectively, adapted to receive seismic information.

The term seismic trace or channel is intended to mean the record formed on a record medium by reception of a train of signals from an individual geophone location. Each trace is in effect a record with time of the occurrence and magnitude of the signals received. It will be noted at this point that most seismic records are capable of recording simultaneously twenty or more trains of signals from as many geophone locations. In some instances, one geophone location may actually consist of a plurality of geophones connected together to form one signal.

The term seismic signal is intended to mean the electrical signal formed by a geophone or other seismic transducer in response to the reception of seismic energy or waves. It is also intended to mean the electrical signals that are formed by reproducing a seismic trace from a reproducible record medium. It is further deemed to mean the "pure" seismic signal—divorced from any carrier signal and the like. In the event that a seismic trace is actually a recording of a carrier wave modulated by a seismic signal, it will be assumed that the seismic signal is isolated from the carrier wave in the reproduction process.

The term seismic section shall be intended to mean a seismogram prepared from one or more field seismograms in which the individual seismic traces have been corrected for one or more seismic corrections. The individual traces that form the section are arranged in the same lateral order as the geophone locations corresponding to the traces; and the widths of the traces are preferably proportional to the distances between the geophone locations so as to render the final product a reasonably accurate map or vertical cross section of the portion of the earth under study. Since the vertical dimensions of the information on the section are actually "time" information, it will be recognized that any lateral or other measurements obtained in the form of conventional linear units must be rendered consistent with the time information on the vertical scale—as by the application of seismic velocity information. Such procedures, of course, are well known to persons skilled in the art; and a detailed discussion of this type of operation is not considered to be a necessary part of this description.

Having thus briefly indicated the general meanings of some of the terms to be used in the following discussion, attention is now directed to FIGURE 1 of the attached drawing which illustrates a commercially available playback system adapted to receive a magnetic tape-type seismogram and to prepare a seismic section from one or more such seismograms.

The apparatus is essentially a schematic representation of a unit which is manufactured by Electro-Technical Labs of Houston, Texas. This unit has been described in an article in the Oil and Gas Journal, vol. 54, No. 78, October 29, 1956, page 70.

The apparatus illustrated in FIG. 1 includes a seismogram drum 12, a correction drum 14 and a section drum 16 all mounted on and driven in unison by shaft 18. Shaft 18 is in turn driven by an electrical motor or other conventional power source not shown.

Seismogram drum 12 is provided with a multi-head reproducing means 20, each head being adapted to playback or reproduce one of the seismic traces on the seismogram. It will be noted in the figure that the ends of the seismogram tape on the drum come together at a point or line 22, and it will be further noted that all tapes when mounted on the drum are mounted in such a manner that the shallow recording portions of the tapes are reproduced before the deep portions.

Figure 3:
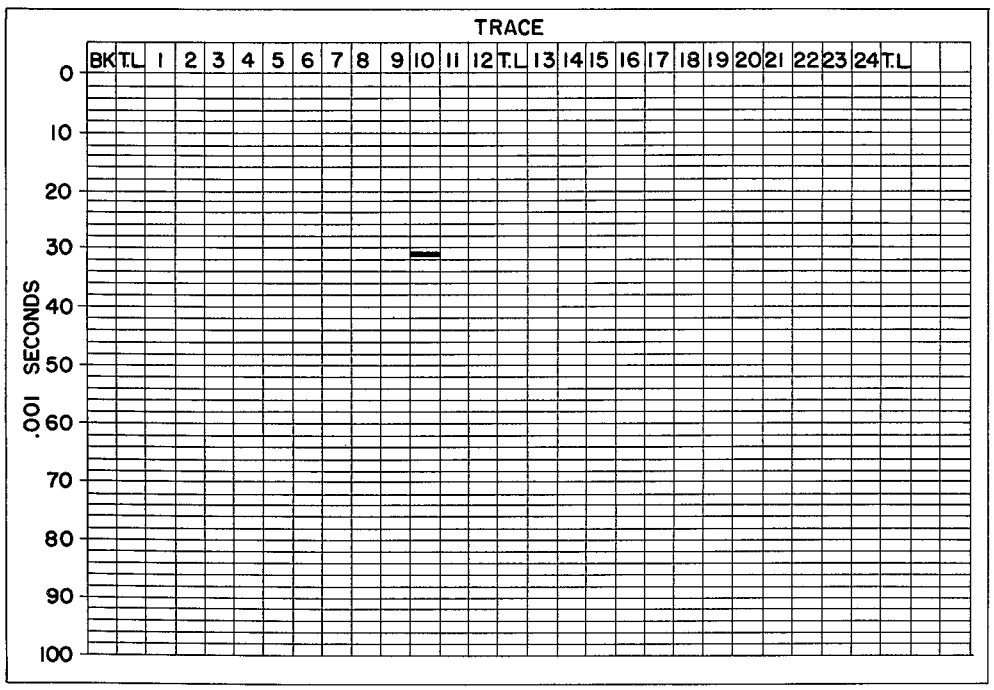
FIGURE 3 illustrates a card on which an identifying mark may be placed for correcting the record.

Reproducing means 20 are connected electrically with contact arm 24 which in effect is a pivoted contact arm adapted to contact separately each head of the reproducing means. Sequence control means 26 determines the order in which contact arm 24 contacts the various traces on record drum 12. Signals received by the trace selector from the reproducing means are transmitted by suitable electrical circuit means to the recording head 28 on the correction drum 14. Head 28 in the commercial version of the apparatus in FIG. 1 serves the function of incorporating static seismic corrections in each trace which is reproduced from the seismogram 12 and transmitted to the correction drum 16. The actual mechanism used in the commercial apparatus for adjusting the position of head 28 is not illustrated in FIG. 1. Instead, a more schematic and simplified version of the actual apparatus is illustrated there. The simplified version incorporating the improvements of this invention includes an arm 30 which is pivotally supported by shaft 18 and with arm 30 supporting head 28 at one end and on the other end an arcual gear segment 32 meshing with a worm gear segment 34, the latter segment is attached to a shaft or rod 36 which is rotated by a reversible motor 38. Thus, rotation of the rod 36 back and forth, causes head 28 to move back and forth along the periphery of drum 14 in relation to head 40. By suitably designing the gear ratios and relative positions and size and by calibrating or controlling the rotational movement of rod 36, it is possible to adjust the position of head 28 for any given seismic trace in terms of time displacement so as to incorporate static time corrections within the trace. In a preferred embodiment a card 41, such as illustrated in FIG. 3, is placed upon the periphery of card drum 42. Arranged across card 41 from left to right are vertical columns. There is one column for each trace to be reproduced. These columns are divided into divisions denoting a time correction, preferably from 0 to 100 which is in .001th of a second. This static time correction is determined by the interpreter for each trace and takes into account depth, elevation of the surface, velocities and so forth. An identifiable mark, preferably an electrical conductive mark, is placed on the card for each trace to incorporate the desired static correction in head 28 with respect to head 40. The identifiable mark may be a pencil mark, punch mark or any identifiable mark and may be placed on a card, card tape or other media.

Figure 2:
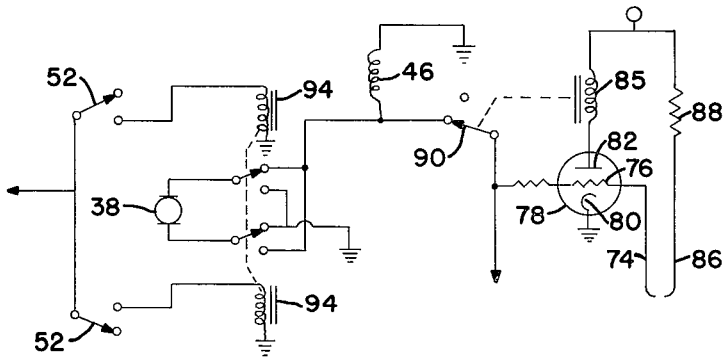
FIGURE 2 illustrates the electrical circuit of the sensing element which automatically positions the correction for incorporation to the final section. This electrical circuit is used for incorporating both the static and dynamic correction factors into the seismic record.

As sensing elements 44 come into contact with an electrical conductive mark on card 41 carried by card drum 42, motor 38 will be stopped and magnetic clutch or brake 46 will instantaneously effect the stopping of the rotation of rod 36 and the proper static correction factor will be incorporated into the positioning of head 28. It should be noted that motor 38 turns circular gear 48 which is securely fastened to or made an integral part of rod 36. The rotating of gears 48 meshes with linear gear segment 50 which drives the sensing element carrigae mechanism or platform 54 along the way. Platform 54 is slidably mounted upon parallel rods 55 which support platform 54 and permit longitduinal movement. If when the mechanism is set in operation sensing element 44 is carried to one end of card drum 42 without encountering the identifiable mark, reversible switch 52 attached to either end of platform 54 will encounter shaft, or rod 36 actuating the reversing switch which reverses the direction of rotation of motor 38 and drives the sensing element carriage mechanism 54 in the opposite direction until the sensing elements 44 come in contact with the electrical conductive mark placed on card 42, at which time, the motor and brake automatically and instantaneously stops the rotation of rod 36 which also stops worm gears 34 and fixes the position of head 28 for that particular trace. It should be noted at this point that motor 38, as well as drum 42, and the entire sensing element carriage mechanism and attendant electrical circuit as shown in FIG. 2 is not used in the actual commercial apparatus and form one component of the improvement which constitutes the subject matter of the present invention. The operation of the electrical circuit illustrated in FIG. 2 will be explained hereinafter in detail. On the commercially available unit, the adjustment of the position of head 28 is achieved by means of a hand actuated crank which moves a traveling nut not shown, along a lead screw also not shown which moves head 28 about the periphery of drum 14.

After head 28 has started to record a trace on drum 14 in response to signals received from reproducing means 20, the trace on drum 14 moves around the drum until it comes under head 40. This head reproduces the trace and transmits the resulting signals via electrical circuit means 82 to recording device 103 on section drum 16. The latter device is of a character to form a record of the signals in the form of trace information on the recording medium which is placed on drum 16. As indicated earlier, recording device 103 may be any one of several conventional seismic recording devices adapted to form a trace recording on whatever record medium is placed on the section drum. For the purposes of this description, it will be assumed that the recording device is an oscillographic pen and that ordinary recording paper is mounted on the section drum.

Reproducing head 40 in the commercial version of the apparatus of FIG. 1 functions not only to reproduce the trace information on drum 14 but also to incorporate any dynamic or variable time corrections which are necessary or desirable in the trace information. Thus, in both the commercially available unit and also in the simplified unit illustrated in the figure—means are provided for continually adjustnig the position of this head relative to head 28 throughout the recording of each trace. And, as in the case of the movement of head 28, the mechanism illustrated in the figure for effecting proper movement of head 40 varies somewhat in form—but not in principle—from the mechanism employed in the commercial version.

In FIG. 1, head 40 is indicated to be mounted on arm 56, which like arm 30 is pivotally mounted on shaft 18. A line or string 58 is attached to arm 56 which is spring loaded or otherwise designed to exert a continual tension on line 58. The other end of line 58 is attached to a traveling nut 60 which is carried by lead screw 62. A traveling block 64 is mounted upon a double lead screw 66 which is driven in relative motion from shaft 18. Between traveling nut 60 and support arm 56, line 58 is slidably supported by traveling block 64 as by hook 63 and by pivot 98 which may be a guide pulley. It will be noted that a variable triangle is formed by traveling nut 60, traveling block 64 and pulley 98. The position of traveling nut 60 upon lead screw is determined by the rotation of lead screw 62 whose rotation is controlled by sensing elements 68 coming into contact with electrical conductive marks contained on a medium card 69 which is wrapped around and carried by card drum 70.

As is apparent in FIG. 1, the movement of head 40 along drum 14 depends upon the position of traveling nut 60 and the movement of traveling block 64. By proper designing and positioning of the traveling block, the traveling nut in relation to arm 56, the variation in length of legs A and B will vary the length of line from pulley 98 to arm 56 in the proper proportion at the proper time to continually position head 40 so as to incorporate the variable or spread correction into the trace.

Figure 5:
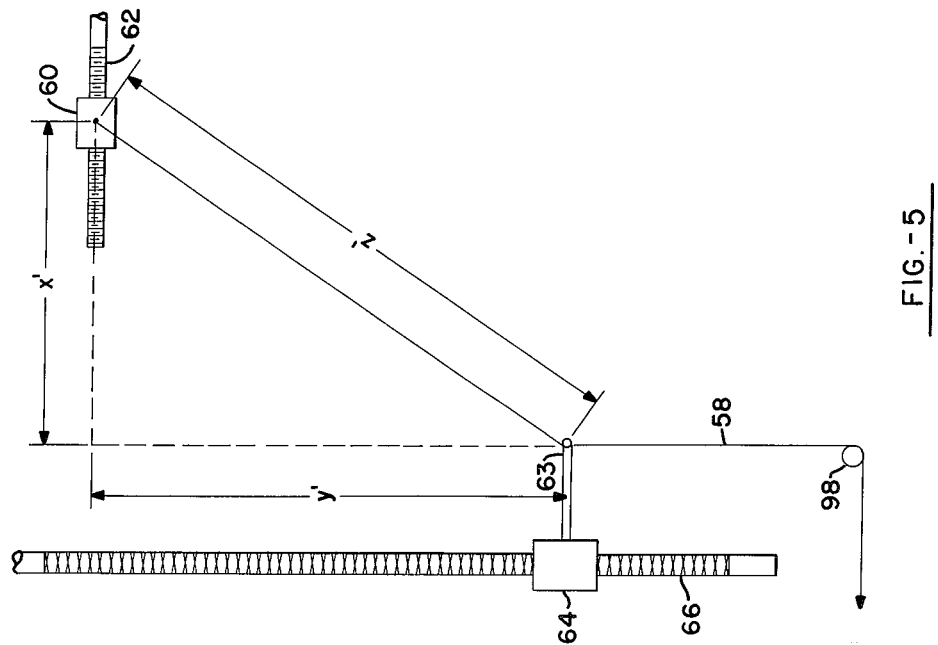
FIGURE 5 is a diagram representing the function of the continuous spread corrector device of this invention.
Figure 4:
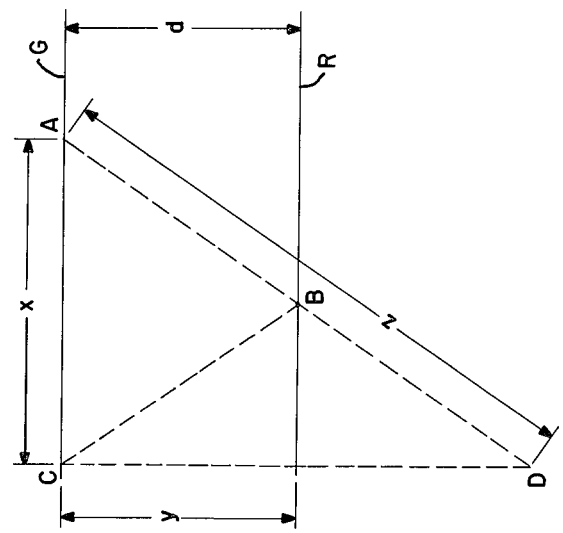
FIGURE 4 is a schematic representation of a vertical section of earth along a selected profile showing the geometry involved in making the spread correction.

The manner in which the spread correction is automatically incorporated into the projected record during the scanning of the original record can be understood from a study of FIGS. 4 and 5. Referring first to FIG. 4, which is a simple geometric figure representing a vertical section of earth along a selected seismic profile, it is assumed that line G represents a selected portion of the surface of the ground with an explosive shot placed near the surface at point A and a geophone on the surface at point C. Seismic energy in traveling from the shot to the geophone as a reflected wave from a subsurface layer represented by line R at a depth $d$ takes the path A—B—C. The time of travel from the instant of detonation of the shot to the time that a reflection from subsurface R reaches point C is proportional to the distance A—B—C, whereas the actual depth of interest is represented by $d$. If a perpendicular line is drawn from point C to line R and the triangle thus defined whose hypotenuse is BC is "folded over" on line R, an enlarged triangle ACD is obtained in which the distances of interest are more clearly presented. Thus, the distance A—B—D is exactly the same as the distance A—B—C and the distance C—D is twice the distance $d$. In the triangle ACD the distance A—C, which may be represented by $x$, is equivalent to the spacing between the geophone and the shot point. The distance A—D, which may be represented by $z$, is equivalent to the length of the actual travel path of a reflected wave in traveling from point A to the reflecting layer R and then to the geophone C. Likewise, the distance C—D, which may be represented by $y$, is the distance the reflected wave would have traveled if the travel path were truly vertical. In terms of travel time, $z$ is the actual travel time for the recorded event and $y$ is the travel time to which it is desired to correct the record.

The triangle ACD can be directly applied to the spread corrector mechanism as shown in FIG. 5. Thus, the distance $x$, i.e., the distance from the shot point to the geophone will have as its equivalent in FIG. 5, the distance $x'$, which is the distance the end of cable 58 that is attached to the traveling nut 60 is displaced laterally from a straight line projection of the major portion of the tape as shown between pulley 98 and traveling block 64. The distance $y'$, which will change as successive portions of the trace are scanned, will at all times be proportional to the distance $y$ in FIG. 4. Traveling block 64 travels the length of lead screw 66 and returns to its initial position for each revolution of drum 14 such that the distance $y'$ will always be proportional to the distance $y$ in FIG. 4. It will then be seen that $z'$ in FIG. 5 must correspond to the distance $z$ in FIG. 4. Since the tape 58 is of constant length, the shifting of traveling nut 60 laterally will cause arm 56 to move reproducing head 40 laterally along the periphery of drum 14. For a displacement $x'$ of traveling nut 60, reproducing head 40 will be moved lengthwise along the periphery of drum 14 a distance equal to or at least proportional to length $z'$ minus length $y'$, which continually varies as traveling block 64 moves the length of lead screw 66 and returns to its starting point, which movement is completed with the completion of the reproduction of each trace. Inasmuch as this difference is equal to the amount of correction that it is desired to incorporate into the record, it will be seen that the spread correction is automatically imparted for any reflection depth. Traveling nut 60, which determines the length of $x'$ is automatically positioned for each trace by the use of the automatic positioner utilizing the card drum as elsewhere explained herein.

In the commercial version of the equipment in FIG. 1, the position of arm 56 would in effect be determined manually. By manually positioning a cam follower (not shown) supporting arm 56 upon the proper radial contour along the axis of an especially designed cam (not shown) the cam would then be rotated to incorporate the proper correction into the trace as it is reproduced by moving the reproduction head along the periphery of the correction drum. In the present invention, the cam and cam follower are eliminated and the spread or step-out correction is obtained automatically by proper positioning of traveling nut 60 and traveling block 64 which, by changing the path of line 58, as explained above, automatically and continually adjusts the position of arm 56 which supports head 40. The exact operation of the sensing element and carriage mechanism will be described more fully in connection with FIG. 2.

As the head 40 reproduces a seismic trace on drum 14, the resulting seismic signals—as indicated earlier—are transmitted to recording means 103 to adjacent section drum 16. Recording means 103 in response to the signals received generates a trace—in this instance an oscillographic-type inked trace—on the recording medium on the drum.

The position of recording means 103 along the axis of drum 16 is determined by its position on screw 72. In the commercial version of the illustrated apparatus, the recording means is threaded to receive the screw, and the screw is rotated by hand until the recording means is positioned at the desired point along the length of the drum. As mentioned earlier, the position from one trace to the next is preferably adjusted to correspond to the actual distances prevailing between the corresponding geophone locations responsible for the traces. The distances between the traces are furthermore made consistent in time units with the lengths of the traces by incorporating seismic velocity information in a known manner. If desired, a card programming device similar to the device used to incorporate the static correction may be utilized to rotate screw 72 so as to advance automatically recording means 103 the desired distance between the recording of the various traces.

At this point it should be noted that the velocity of seismic waves frequently varies in depth within any particular portion of the earth. In most instances the variations are reasonably small; and a single velocity value may be conveniently assumed for an entire cross section of the earth at that point. In other instances, however, it may be more desirable to actually use the different velocity characteristics that actually prevail throughout a section of the earth. The apparatus illustrated in FIG. 1 may be utilized to incorporate corrections occasioned by velocity variations simply by placing the mark in the proper position on the programming card 69 that is placed upon the card drum 70. The sensing element will seek out the mark as each trace is run, and will actuate electrical circuits such that traveling nut 60 will be properly positioned to incorporate such corrections as are occasioned by any velocity variation.

As in the case of heads 28 and 40, the position of head 103 in accordance with the present invention may be attained automatically with the aid of a card programming device similar to the ones used to position traveling nut 60 and actuate gear segment 32. The use of programming devices and the function they perform in attaining the objects of the present invention are now to be considered in this description. Accordingly, attention is now directed to FIG. 2 which presents a schematic illustration of an apparatus and electrical circuit of a character to program and automatically actuate head 28 so as to incorporate predetermined static time corrections in each trace of seismic information on seismogram drum 12 as the traces are reproduced therefrom and thereafter recorded on section drum 16.

A motor 38 drives the sensing element mechanism across card drum 42 with the sensing element 44 seeking the identifiable mark previously placed on the card 41. The mark may be a punch mark or any other identifiable mark on a card tape or any other media provided for containing the mark, but for convenience, it is preferably a pencil mark with the mark being electrically conductive. As the fingers of the sensing element come into contact with the mark on the card, an electrical current flows through the mark and acts in a manner to stop the motor and apply a brake to the motor simultaneously so that the fingers remain in contact with the mark. When the fingers of sensing element 44 come into contact with an identifiable mark made of an ordinary pencil lead, a resistance of preferably approximately 5000 ohms is encountered. However, the resistance is not critical and may be as high as 5 megohms. As shown particularly in FIG. 2 one finger 74 of sensing element 44 is electrically connected to the grid 76 of an electric valve 78, which may be a vacuum tube such as a triode. The opposite side of grid 76 is connected to a negative voltage source preferably approximately −12 volts with a resistance of preferably 1.0 megohm between the source and the grid. The cathode 80 of the electric valve 78 is grounded and the anode 82 is electrically connected through relay 85 to a positive source of electricity of preferably approximately 180 volts, although the voltage is not critical. The other finger 86 of sensing element 44 is connected through a resistor 88 of preferably approximately 10 megohms to the relatively high positive voltage. The resistance of resistor 88 should be sufficiently high to prevent excessive grid current. When the fingers of sensing element 44 are open, no current is flowing between the cathode and the anode as the grid is negative with respect to the cathode. However, when sensing element 44 encounters the identification mark on the card drum, the resistance is sufficient to raise the voltage on the grid to where the voltage on the grid is within a few volts of the cathode voltage. This causes a flow of electrons through the electronic valve which operates relay 85 which in turn opens switch 90, thus stopping motor 38. A magnetic clutch 46, which also has a braking action, immediately stops the movement of the fingers so that the fingers of the sensing element, remain in contact with the identifiable mark for the trace being recorded. It is thus seen that by proper design and calibration of the card drum, motor 38, carriage mechanism 54, worm gear 34, gear segment 32 and arm 30, proper static corrections may be incorporated automatically. After the card is moved to a new position so that another column corresponding to another trace is beneath the fingers then the carriage mechanism will hunt the mark in that column. Limit switches 52 are provided at either end of the carriage. If the fingers do not come into contact with the mark, the carriage mechanism engages one of the limit switches at the end of the ways, then the limit switch applies voltage to throw a latch relay 94 which in turn reverses the motor and the fingers search for the mark while traveling in the opposite direction.

Step switch 96 is provided to operate in cooperation with sequence control selector 26 which cooperates with section drum 16 so that as drum 16 makes one revolution recording a trace thereon the selector switch 96 will rotate card drum 42 to where sensing element 44 will be in another column which has a mark to provide the static correction for the next trace to be reproduced. It is understood that the card to be placed upon card drum 42 has correction marks for each of the traces placed in appropriate columns by an operator who is familiar with the correction requirements.

Sequence control means 26 can be set to move contact 24 to the next trace to be reproduced at the same time that selector switches 96 and 102 advance card drums 42 and 70 which may preferably be set near the end of each trace which would sacrifice a relatively small portion of the information on the tape—the information sacrificed being that of least interest on the record. It will of course be recognized, that the drum 12, 14 and 16 may be made sufficiently large in comparison to the length of the magnetic tape to insure complete playback of all information on every trace of the tape.

Turning now to head 40 through which spread corrections are incorporated, it will be recognized that programming and correction mechanisms substantially identical with the mechanism just described for head 28, are employed in connection with this head with minor obvious variations. Thus, in the case of head 40, it will be recognized that substantially all seismic observations involving a plurality of geophone locations, all of the spread corrections of the geophone locations progressively remote from a seismic special point will have progressively larger spread corrections for a given depth. These corrections are placed on a card 69 which, in turn, is placed upon card drum 70, which in the manner similar as described above, controls the position of traveling nut 60 upon screw 62 for each trace. The geometry of this correction has been explained above. By proper design and calibration of double lead screw 66 and proper spaced relationship between traveling nut 60, traveling block 64 and pulley 98, the length of $z'$ minus $y'$ as traveling block 64 moves to the outer end and returns to the inner end of double lead screw 66 will vary in a determinable manner. This variation will continually position head 40 along the periphery of drum 14 and automatically incorporate proper spread corrections thereon.

Turning next to recording means 103, it will be recognized that the primary distinction between the operation of this mechanism in conjunction with screw 72 and the operation of worm gear 34 and traveling nut 60 lies in the fact that device 103 does not travel back and forth along screw 72. Instead it is desirable that the device travel the length of the screw once for each section, stopping at predetermined points corresponding to the relative positions and the geophone locations responsible for the various traces. A card programming device similar to the device used to incorporate the static correction may be utilized to rotate screw 72 so as to automatically advance recording means 103 the desired distances between the recording of the successive traces. The card programming device will also have a selector switch which cooperates with selector switch means 26.

While the foregoing description and the attached drawing illustrate an embodiment of the invention contemplated to constitute the best mode of practicing the invention, it will be recognized that numerous variations and modifications may be incorporated therein without departing from the spirit or scope of the invention. For example, the apparatus may employ modulators, amplifiers, demodulators, driver circuits and the like as are necessary for satisfactory and suitable performance of the equipment. Again, it is possible to reduce the number of drums in the equipment to two drums—a record drum and a section drum. In such an arrangement, the head bank 20 would serve not only to reproduce the traces on the record drum 12 but to replace the function of head 28 on drum 14. Similarly, the pickup head 40 on the correction drum would be moved into a corresponding position on the section drum 16. The static correction drive and preprogramming mechanism and the spread or variable seismic correction drive and preprogramming mechanism would have to be repositioned to adjust the head bank and the playback head, respectively.

Because of the complexity of the mechanical linkages of a two drum system and because with the three drum system described a single record head 28 and pick up head 40 are used as opposed to a multiple head 20 on drum 12, the three drum system is much preferred.

Having considered in detail the structural components of the apparatus embodiment illustrated in the attached drawing, attention is now directed toward a description of the manner in which the apparatus may be operated. Thus, as indicated earlier, a field seismogram is mounted on record drum 12 and a recording medium in the form of paper is mounted on drum 16. Recording means 103 is positioned by hand at a point on the section drum where it is desired to initiate the recording of a seismic section. A clutch 100 may be provided to disengage the recording means 103 from the feed screw 72 to permit hand positioning of the recording means. Contact arm 24 is positioned upon head 20 so as to pick up the signal from the first trace desired to be reproduced.

Following the determination from actual field observations as to what corrections must be imparted to the traces on the seismogram, proper index marks are positioned on cards 41 and 69 as hereinbefore described. A static time correction card is placed upon card drum 42 and the correction card containing the spread correction is placed upon card drum 70. Once the preprogramming of the desired corrections has been accomplished, the various energizing relays may be closed, and the formation of a seismic section from the seismogram on the drum 12 may be initiated.

When the sensing element 44 comes into contact with the mark for the trace being reproduced, the motor 38 is stopped as is the rotation of worm gear 34 which properly positions head 28 on the periphery of the correction drum to incorporate the static correction. Traveling nut 60 is likewise positioned upon screw 62 which positions the initial length of $x'$ which determines the magnitude of the spread correction by properly positioning head 40 on drum 14. Head 28 then records the trace on correction drum 14 from whence head 40 reproduces each trace which is then recorded by recording means 103 on section drum 16. As one trace is completed, sequence selection means 26 serves to advance contact arm 24 to the next trace to be reproduced and also to advance selector switches 96 and 102 to the next column on cards 41 and 69 for the next succeeding trace which is reproduced and corrected in substantially the same manner as the trace described above. Recording head 103 is likewise advanced the proper distance, either manually or automatically. The process is repeated until the entire seismogram has been scanned and converted into a seismic section. At that time, the apparatus may be manually or automatically turned over in any conventional manner.

What is claimed is:

1. A card programming device to provide automatic positioning of a mechanism to correspond to the position of an identifiable mark comprising in combination, a card capable of carrying electrically identifiable marks thereon, a card carrier on which said card may be mounted, a sensing element capable of detecting said marks, means for carrying said sensing element back and forth across said card in either direction while in contact therewith, and a positioning mechanism adapted to be positioned in a predetermined position by said sensing element coming into contact with said identifying marks.

2. In an apparatus for preparing a seismic section from a multitrace reproducible seismogram including reproducing means which includes a recording head means and a reproducing head means adapted to scan, record, and reproduce sequentially each trace on the seismogram and re-recording means adapted to receive the resulting signal from said reproducing head means and to record them as separate traces in a side by side relation on a recording medium, the improvement which comprises a first combination programming and positioning means with corrections of said seismogram determined by an identifiable mark carried on a media and adapted to adjust said recording head means along the length of each trace thereon in the same sequence as the traces are reproduced, a second combination of programming and positioning means with a second correction of said seismogram determined by an identifiable mark carried on a media and adapted to effectively move said reproducing head means lengthwise along each trace relative to said recording head means in the same sequence as the traces are reproduced and sequence control means adapted to actuate said first and second positioning means once for each trace on the seismogram.

3. A card programming device to provide automatic positioning of a mechanism to correspond to the position of an identifiable mark comprising a shaft, a motor adapted to drive said shaft, a circular gear mounted on said shaft, a linear gear segment meshing with said circular gear, a carrier platform upon which is mounted said linear gear segment, a limit switch on either end of said platform positioned to encounter said shaft and adapted to reverse the rotation of said motor as said platform is driven by said gear to the end thereof, a card capable of carrying electrically identifiable marks thereon, a card drum on which said card may be mounted, the axle of said card drum being spaced from said platform and parallel to said linear gear, two sensing fingers attached at one end to and carried by said platform and with the other end of said fingers contacting said card, an electronic valve having a cathode, an anode and a grid, with its grid electrically connected to one of said sensing fingers with the other terminal of said grid being electrically connected through a resistance to a negative voltage source, a relay electrically connected to the anode of said electronic valve, said anode being electrically connected to a positive source of electricity, a resistor being electrically connected serially between the other finger of said sensing element and said positive source of electricity, a switch in the circuit supplying power to said motor with said switch physically connected to said relay, whereby when said sensing fingers are electrically connected by said mark, the potential on said grid is raised sufficiently to cause flow of current through said electronic valve thereby energizing said relay which automatically and instantaneously opens said switch whereby said motor is stopped at a position predetermined on said card.

4. An apparatus according to claim 3 with the further improvement in which a magnetic clutch engageable with the shaft of said motor is electrically connected to said power source whereby when said switch is opened, said motor is stopped instantly by said clutch.

5. In a seismic recording or reproducing apparatus including means for mounting a recording medium, a transducer adjacent said recording medium and means for providing relative movement between the transducer and the medium, the improvement which comprises a lead screw, a traveling nut on said lead screw, a double lead screw cam means, a traveling block on said double lead screw cam means, a flexible connecting means extending from said traveling nut to said transducer and slidably supported by said traveling block on said cam means, biasing means on said transducer to maintain tension on said flexible connecting means, means for providing relative movement between said cam and said medium, motor means adapted to continuously rotate said lead screw and thereby move said traveling nut and said transducer, programming means adapted to start and stop said motor means in a predetermined sequence, and sequence control means to actuate said programming means.

6. In a seismic recording or reproducing apparatus including means for mounting a recording medium, a transducer adjacent said recording medium and means for providing relative movement between the transducer and the medium, the improvement which comprises a shaft, a worm gear mounted upon and around said shaft and adapted to rotate with said shaft, supporting means extending from said worm gear to said transducer to support said transducer, a gear segment on said support means meshing with said worm gear, motor means adapted to continuously rotate said shaft and thereby rotate said worm gear and thereby imparting movement in said transducer, programming means adapted to start and stop said motor means in a predetermined sequence, and sequence control means to actuate said programming means.

7. A programming device using a card capable of carrying an electrical identifiable mark thereon in different columns for positioning an element which comprises in combination a lead screw, a traveling nut on said lead screw, a double lead screw cam means, the lead screw being perpendicular to the double lead screw cam means, a traveling block on double lead screw cam means, a flexible connecting means extending from said traveling nut to the element to be positioned and slidably supported by said traveling block on said cam means, biasing means to maintain tension on said flexible connecting means, a card carrier on which the card may be mounted, a sensing element capable of detecting marks on the card, means for carrying said sensing element back and forth across said card in either direction while in contact therewith, and means to position said traveling nut on said lead screw responsive to the position of the mark on the card.

8. An apparatus according to claim 7 including sequence control means to actuate the sensing means to sequentially scan preselected columns on the card.

References Cited in the file of this patent

UNITED STATES PATENTS

| | | |
|---|---|---|
| 1,402,797 | Roschach | Jan. 10, 1922 |
| 1,847,533 | Lasker | Mar. 1, 1932 |
| 2,418,136 | Munson | Apr. 1, 1947 |
| 2,452,251 | Newman | Nov. 9, 1948 |
| 2,508,603 | Gollwitzer | May 23, 1950 |
| 2,688,124 | Doty | Aug. 31, 1954 |
| 2,765,455 | Neiners | Oct. 2, 1956 |
| 2,876,428 | Skelton et al. | Mar. 3, 1959 |
| 2,932,001 | Reynolds | Apr. 5, 1960 |